Jan. 26, 1960
M. KANN
2,922,456
THREADED FASTENER RETAINING DEVICE
Filed June 24, 1957
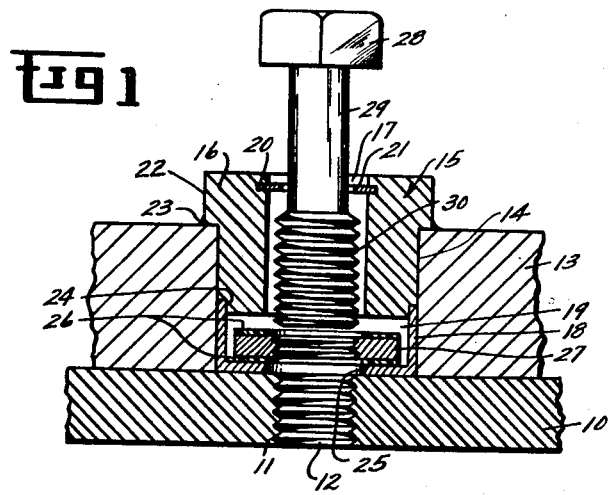
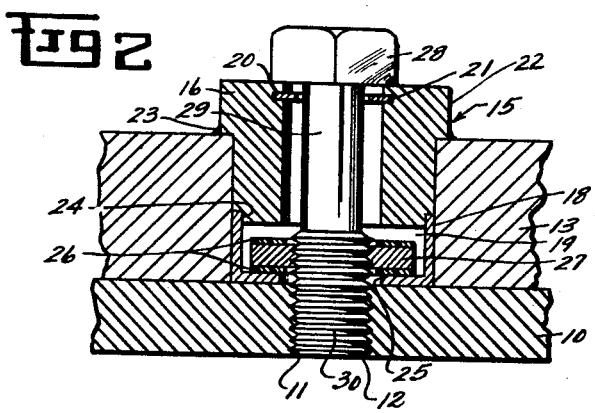
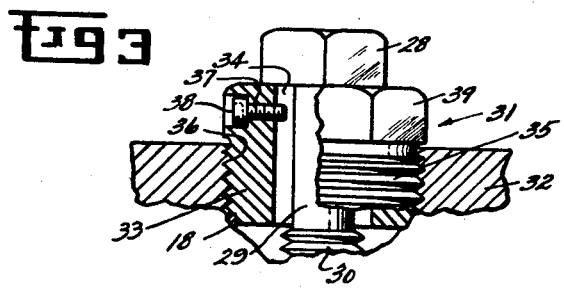
INVENTOR.
MYRON KANN
BY
Paul R. Webb, II
ATTORNEY United States Patent Office 2,922,456
Patented Jan. 26, 1960

2,922,456

THREADED FASTENER RETAINING DEVICE

Myron Kann, Cincinnati, Ohio, assignor to General Electric Company, a corporation of New York Application June 24, 1957, Serial No. 667,429

6 Claims. (Cl. 151—69)

This invention relates to threaded fastener retaining devices and more particularly to threaded fastener retaining devices which house securely the threaded portion of a fastener therein when the retaining device is not affixed to another structure.

One type of prior retaining device employs a cover plate with a threaded aperture therein and a headed bolt with a threaded end portion and an undercut shank portion. The threaded end portion is threaded through the cover aperture to associate the bolt with the cover. After alignment of the bolt with a corresponding aperture in an adjoining structure, the cover plate is fastened to the adjoining structure by threading the bolt in the structure aperture. While such an arrangement simplifies a fastening operation because the bolt remains associated with its cover plate, the threaded bolt portion is exposed to damage during the aligning step.

Another retaining device includes an elastic washer in the counterbore of its housing to secure the threaded portion of a bolt therein when the retaining device is not engaged to an adjoining structure. Such a washer exerts a binding force against the unthreaded bolt shank to prevent the bolt from easily sliding out of its housing. However, an accidental force on the bolt head would overcome the binding force and expose the bolt threads to damage outside the housing.

The invention of the present application provides an improved threaded fastener retaining device which retains positively at any attitude the threaded portion of the bolt within the device in its disengaged condition.

It is an object of my invention to provide an improved threaded fastener retaining device which tolerates reasonable misalignment between axes of the retaining device and engaged structure.

It is another object of the invention to provide an improved threaded fastener retaining device which employs a pair of resilient members with a threaded bolt follower therebetween to retain the threaded portion of a bolt within the device in its disengaged condition.

It is another object of the invention to provide an improved threaded fastener retaining device into which a new bolt can be inserted rapidly.

It is a further object of the invention to provide an improved threaded fastener retaining device which is positioned rapidly in a flange aperture to produce a fastening structure.

In carrying out my invention in one form, a housing has an axial bore therethrough, a closure at one end thereof, a pair of resilient members with a threaded bolt follower therebetween within the closure, and bolt retaining means at the opposite end of the housing to provide a threaded fastener retaining device.

These and various other objects, features and advantages of the invention will be better understood from the following description taken in connection with the accompanying drawing in which:

Fig. 1 is a sectional view of a lower flange and an upper flange with a threaded fastener retaining device embodying my invention;

Fig. 2 is a sectional view similar to Fig. 1 in which the upper flange with threaded fastener retaining device is engaged with the lower flange; and Fig. 3 is a sectional view of a modified threaded fastener retaining device.

In Fig. 1 of the drawing, a lower flange 10 is shown with at least one aperture 11 therein which is threaded as at 12. An upper flange 13 positioned on lower flange 10 is provided with an aperture 14 into which a threaded fastener retaining device 15 is positioned to form a fastening structure. Device 15 includes a housing 16 with an axial bore 17 therethrough forming an opening at each end thereof and a closure 18 defining a cavity 19 therein positioned adjacent the lower end of housing 16. At upper end of bore 17 adjacent its opening, a recess 20 seats a retainer 21 to provide an upper threaded fastener retaining element. An outwardly extending flange 22, which is located at the upper end of housing 16, seats against the exterior surface of upper flange 13. Device 15 is press fitted in aperture 14 or welded therein as at 23.

Closure 18 is attached on a shoulder 24 around the periphery of lower end of housing 16. An aperture 25 is disposed centrally in the bottom wall of closure 18, communicates with cavity 19 therein, and is in axial alignment with bore 17 of housing 16. A pair of resilient washers 26 with a threaded bolt follower 27 positioned therebetween are retained rotatably within cavity 19 to provide a lower threaded fastener retaining element. A headed bolt 28, which is located in bore 17 and cavity 19 of threaded fastener retaining device 15 includes a reduced shank portion 29 movable within bore 17, and a threaded end portion 30 having a shorter length than the distance between retainer 21 and lower bore opening of housing 16 and movable within bore 17 and cavity 19. In its disengaged condition, threaded portion 30 of bolt 28 is retained between retainer 21 and the upper surface of threaded bolt follower 27 within device 15 to protect the threaded portion against damage.

In Fig. 2, upper flange 13 is shown affixed to lower flange 10 by means of bolt 28. Threaded portion 30 of bolt 28 engaged threads 12 of aperture 11 in lower flange 10 to provide a tight joint between flanges 10 and 13. While threaded bolt follower 27 engages threaded end portion 30 of bolt 28, resilient members 26 clear the outside diameter of threaded end portion 30.

In the operation of bolt retaining device 15, closure 18 with resilient members 26 and threaded bolt follower 27 therein is attached on shoulder 24 of housing 16. Headed bolt 29 is inserted through the upper bore opening of housing 16 and retained at its lower end on the upper surface of threaded bolt follower 27. After insertion of bolt 28, retainer 21 is positioned in recess 20 of housing 16 to prevent bolt removal from upper bore opening by lifting, gravity or threading. Threaded portion 30 is restrained positively from exposure outside retaining device 15 unless bolt 28 is threaded through bolt follower 27. Device 15 is then press fitted into aperture 14 of flange 13 or welded therein as at 23. Upper flange 13 is positioned on lower flange 10 with apertures 11 and 25 in alignment. Threaded end portion 30 of bolt 28 is threaded through bolt follower 27 to mate threaded end portion 30 with threads 12 of aperture 11 in flange 10 to join flanges 10 and 13 together. When threaded portion 30 engages bolt follower 27, frictional forces between bolt follower 27, lower resilient member 26 and closure 18 prevent rotation of thread follower 27 until the leading helix of threaded portion 30 contacts the leading helix of threads 12. If leading helix of threaded portion 30 is in rotational phase with leading helix of threads 12, threaded portion 30 engages with threads 12 and feeds into aperture 11 of flange 10.

However, if leading helixes of threaded portion 30 and threads 12 are not in rotational phase, bolt follower 27 and upper resilient member 26 will lift from lower resilient member 26 and spin free until leading helixes of threaded portion 30 does engage threads 12. Bolt 28 continues threading and bolt follower 27 rotates freely until it contacts again lower member 26. Any tendency for threaded portion 30 of bolt 28 to be locked by jamming of threaded bolt follower 27 against closure 18, preventing further bolt rotation, is prevented by resilience of lower member 26 which permits threads of threaded portion 30 to axially position the attitude of threads of threaded bolt follower 27 for unbound relative motion of respective threads. After bolt 28 is threaded in aperture 11, flanges 10 and 13 are joined tightly together.

When it is desired to remove flange 13 from flange 10, bolt 28 is turned in reverse direction to unthread threaded portion 30 from threads 12 in aperture 11. During this operation bolt follower 27, which is engaged with threaded portion 30, rotates with bolt 28 until upper member 26 is lifted into pressure contact with the lower end of housing 16. Rotation of follower 27 ceases since bolt follower 277 and upper member 26 are stacked against the lower end of housing 16. Locking of threaded portion 30 with threads of follower 27 before threaded portion 30 clears threads 12 is prevented by resilience of upper member 26. Since threaded portion 30 has a shorter length than the distance between retainer 21 and lower bore opening of housing 16, bolt 28 passes completely through bolt follower 27 before leading bolt threads of threaded portion 30 have risen to contact retainer 21. Bolt follower 27 and associated upper member 26 fall free of threaded portion 30 and position themselves on the inner, lower surface of closure 18. In its disengaged position, bolt 28 has its threaded portion 30 positioned between retainer 21 and upper surface bolt follower 26. It is impossible for bolt 28 to fall free from either end of retaining device 15.

In Fig. 3 of the drawing, a modified threaded fastener retaining device 31 is shown positioned within a flange 32. Closure end of device 31, which is identical to closure 18 in Figs. 1 and 2, includes a pair of resilient members with threaded bolt follower therebetween. Closure 18 is located at the lower end of device 32 and attached on a shoulder 24. At its upper end device 32 has a housing 33 with an axial bore 34 therethrough forming an opening at opposite end thereof. At least a portion of exterior wall of housing 33 is provided with a plurality of threads 35 which mate with corresponding threads 36 in an aperture provided in flange 32. Bolt 28 is inserted in retaining device 32 in the same manner as in Figs. 1 and 2 and is retained at its lower end by upper surface of bolt follower. Housing 33 is provided with at least one opening 37 near its upper end which communicates with bore 34. A threaded member 38 is threaded in opening 37 to extend into bore 34 to provide an upper retainer for bolt 28. Housing 33 is provided with a headed portion 39 at its upper end which simplifies insertion and removal of device 31. Closure 18 with resilient members and threaded bolt follower is attached on lower end of housing 33 and bolt 28 is positioned in bore 34. Threaded member 38 is then threaded in opening 37 to retain bolt 28 within housing 33. After device 31 is assembled, it is readily threaded into flange 32 by means of its threaded portion 35 which mates with threads 36 of flange 32. Threaded member 38 provides a rapid method for replacing a new bolt 28 in device 31 while threaded portion 35 provides an easy and secure fit for housing 33 in flange 32.

As will be apparent to those skilled in the art, the objects of my invention are attained by the use of a housing having an axial bore therethrough, a closure at one end thereof, a pair of resilient members with a threaded bolt follower therebetween within the closure, and bolt retaining means at the opposite end of the housing to provide a threaded fastener retaining device.

While other modifications of this invention and variations of apparatus which may be employed within the scope of the invention have not been described, the invention is intended to include all such as may be embraced within the following claims.

What I claim as new and desire to secure by Letters Patent of the United States is:

1. A threaded fastener retaining device comprising a housing having an axial bore therethrough forming an opening at each end thereof, a closure defining a cavity therein positioned adjacent one end of said housing, said closure having a centrally disposed aperture therein communicating with said cavity and in axial alignment with the bore of said housing, a pair of resilient members with a threaded bolt follower positioned therebetween retained rotatably within the cavity of said closure, said resilient members frictionally preventing rotation of said bolt follower when one of the resilient members is in engagement with either the housing or the closure, bolt retaining means located near the opposite end of said housing adjacent said bore opening, and said retaining device adapted to position a headed bolt having a reduced shank portion, and a threaded end portion in the bore and cavity thereof whereby said bolt retaining means and said threaded bolt follower retain the threaded end portion therebetween during disengagement of said retaining device.

2. A threaded fastener retaining device comprising a housing having an axial bore therethrough forming an opening at each end thereof, said housing having a recess associated with said bore near one end thereof adjacent said bore opening, a retainer positioned in said recess, a closure defining a cavity therein positioned adjacent the opposite end of said housing, said closure having a centrally disposed aperture therein communicating with said cavity and in axial alignment with the bore of said housing, a pair of resilient members with a threaded bolt follower positioned therebetween retained rotatably within the cavity of said closure, said resilient members frictionally preventing rotation of said bolt follower when one of the resilient members is in engagement with either the housing or the closure, and said retaining device adapted to position a headed bolt having a reduced shank portion, and a threaded end portion in the bore and cavity thereof whereby said retainer and said threaded bolt follower retain the threaded end portion therebetween during disengagement of said retaining device.

3. A threaded fastener retaining device comprising a housing having an axial bore therethrough forming an opening at each end thereof, said housing having an opening therein near one end thereof adjacent said bore opening, an external thread formed on at least a portion of said housing, a member positioned in said opening and extending into said bore, a closure defining a cavity therein positioned adjacent the opposite end of said housing, said closure having a centrally disposed aperture therein communicating with said cavity and in axial alignment with the bore of said housing, a pair of resilient members with a threaded bolt follower positioned therebetween within the cavity of said closure, said resilient members frictionally preventing rotation of said bolt follower when one of the resilient members is in engagement with either the housing or the closure, and said retaining device adapted to position a headed bolt having a reduced shank portion, and a threaded end portion in the bore and cavity thereof whereby said member and said threaded bolt follower retain the threaded end portion therebetween during disengagement of said retaining device.

4. A threaded fastener retaining device comprising a housing having an axial bore therethrough forming an opening at each end thereof, a closure defining a cavity therein positioned adjacent one end of said housing, said closure having a centrally disposed aperture therein communicating with said cavity and in axial alignment with the bore of said housing, a pair of resilient members with a threaded bolt follower positioned therebetween retained rotatably within the cavity of said closure, said resilient members frictionally preventing rotation of said bolt follower when one of the resilient members is in engagement with either the housing or the closure, bolt retaining means located near the opposite end of said housing adjacent said bore opening, a headed bolt located in the bore and cavity of said threaded fastener retaining device including a reduced shank portion movable within said bore, and a threaded end portion having a shorter length than the distance between said bolt retaining means and the lower bore opening of said housing, said threaded portion being movable within said bore and said cavity, and said bolt retaining means and said threaded bolt follower adapted to retain the threaded end portion therebetween during disengagement of said retaining device.

5. A threaded fastener retaining device comprising a housing having an axial bore therethrough forming an opening at each end thereof, said housing having a recess associated with said bore near one end thereof adjacent said bore opening, a retainer positioned in said recess, a closure defining a cavity therein positioned adjacent the opposite end of said housing, said closure having a centrally disposed aperture therein communicating with said cavity and in axial alignment with the bore of said housing, a pair of resilient members with a threaded bolt follower positioned therebetween retained rotatably within the cavity of said closure, said resilient members frictionally preventing rotation of said bolt follower when one of the resilient members is in engagement with either the housing or the closure, a headed bolt located in the bore and cavity of said threaded fastener retaining device including a reduced shank portion movable within said bore, and a threaded portion having a shorter length than the distance between said retainer and the bore opening at the end of said housing, said threaded end portion being movable within said bore and said cavity, and said retainer and said threaded bolt follower adapted to retain the threaded end portion therebetween during disengagement of said retaining device.

6. A threaded fastener retaining device comprising a housing having an axial bore therethrough forming an opening at each end thereof, said housing having an opening therein near one end thereof adjacent said base opening, an external thread formed on at least a portion of said housing, a member positioned in said opening and extending into said bore, a closure defining a cavity therein positioned adjacent the opposite end of said housing, said closure having a centrally disposed aperture therein communicating with said cavity and in axial alignment with the bore of said housing, a pair of resilient members with a threaded bolt follower positioned therebetween within the cavity of said closure, said resilient members frictionally preventing rotation of said bolt follower when one of the resilient members is in engagement with either the housing or the closure, a headed bolt located in the bore and cavity of said threaded fastener retaining device including a reduced shank portion movable within said bore, and a threaded portion having a shorter length than the distance between said first-mentioned member and the lower bore opening of said housing, said threaded end portion being movable within said bore and said cavity, and said first-mentioned member and said threaded bolt follower adapted to retain the threaded end portion therebetween during disengagement of said retaining device.

References Cited in the file of this patent

UNITED STATES PATENTS

| 748,078 | Kaisling | Dec. 29, 1903 |
| 2,396,142 | Allen | Mar. 5, 1946 |
| 2,587,134 | Flora | Feb. 26, 1952 |
| 2,717,622 | Flora | Sept. 13, 1955 |

FOREIGN PATENTS

| 765,438 | Great Britain | Jan. 9, 1957 |